United States Patent [19]

Pennaz et al.

[11] Patent Number: 5,354,366
[45] Date of Patent: Oct. 11, 1994

[54] INK COMPOSITION AND RESINS AND METHODS RELATING THERETO

[75] Inventors: Thomas J. Pennaz, Brooklyn Park; Paul F. Schacht, Oakdale, both of Minn.

[73] Assignee: Deluxe Corporation, St. Paul, Minn.

[21] Appl. No.: 127,753

[22] Filed: Sep. 27, 1993

[51] Int. Cl.$^5$ .................. C09D 11/08; C09D 11/10; B08B 3/00

[52] U.S. Cl. ................ 106/20 R; 106/30 R; 106/27 R; 106/29 R; 101/450.1; 101/451; 134/27; 134/29; 523/414; 523/420; 525/526; 525/328.2; 525/328.4

[58] Field of Search ............... 106/20 R, 30 R, 27 R, 106/29 R; 101/450.1, 451; 134/27, 29; 523/414, 420; 525/526, 328.2, 328.4

[56] References Cited

U.S. PATENT DOCUMENTS

| | | | |
|---|---|---|---|
| 3,615,537 | 10/1971 | Giesen et al. | 430/174 |
| 3,996,156 | 12/1976 | Matsukawa et al. | 264/4.7 |
| 4,001,155 | 1/1977 | Kempter et al. | 523/416 |
| 4,001,164 | 1/1977 | Chu | 106/22 R |
| 4,154,618 | 5/1979 | Burke | 106/30 R |
| 4,187,203 | 2/1980 | Murphy | 524/204 |
| 4,312,799 | 1/1982 | Sekmakas et al. | 523/414 |
| 4,371,676 | 2/1983 | Hoene | 526/76 |
| 4,396,732 | 8/1983 | Sekmakas et al. | 523/416 |
| 4,504,374 | 3/1985 | Lewarchik et al. | 204/181.7 |
| 4,588,759 | 5/1986 | Nakaya et al. | 523/414 |
| 4,761,435 | 8/1988 | Murphy et al. | 522/46 |
| 4,777,276 | 10/1988 | Rasmussen et al. | 556/419 |
| 4,797,456 | 1/1989 | Wessling et al. | 525/531 |
| 4,837,290 | 6/1989 | Rasmussen et al. | 526/304 |
| 4,861,841 | 8/1989 | Marrion | 525/327.3 |
| 4,885,355 | 12/1989 | Wessling et al. | 528/99 |
| 4,914,223 | 4/1990 | Rasmussen et al. | 560/49 |
| 4,963,188 | 10/1990 | Parker | 106/30 R |
| 4,966,628 | 10/1990 | Amon et al. | 106/20 R |
| 4,987,160 | 1/1991 | Frihart et al. | 522/164 |
| 4,996,243 | 2/1991 | Rasmussen et al. | 522/99 |
| 5,008,137 | 4/1991 | Nugent, Jr. et al. | 428/35.4 |
| 5,086,111 | 2/1992 | Pinschmidt, Jr. et al. | 525/61 |
| 5,089,100 | 2/1992 | Debroy et al. | 523/417 |
| 5,089,542 | 2/1992 | Nishida et al. | 523/410 |
| 5,114,993 | 5/1992 | Scherping et al. | 523/409 |
| 5,128,391 | 7/1992 | Shustack | 522/92 |
| 5,225,278 | 7/1993 | Kielbania, Jr. et al. | 428/402.22 |

OTHER PUBLICATIONS

The Printing Ink Manual, Fourth Edition (1988) edited by R. H. Leach and published by Van Nostrand Reinhold, no month.

Primary Examiner—Helene Klemanski
Attorney, Agent, or Firm—Dorsey & Whitney

[57] ABSTRACT

An amine functional water reducible resin and an ink composition incorporating an amine functional water reducible resin which is water insoluble under certain pH conditions and selectively water washable under certain other pH conditions. The method aspect of the present invention relates to a method of making, using and recovering the ink composition and a method of making the water reducible resin.

36 Claims, No Drawings

INK COMPOSITION AND RESINS AND METHODS RELATING THERETO

BACKGROUND OF THE INVENTION

1. Field of the Invention

The present invention relates generally to the field of ink compositions and more particularly to water insoluble ink compositions which can be printed in a substantially water insoluble form, but which can be cleaned up using aqueous solutions. Although the ink composition of the present invention can be used in a variety of printing processes, such composition has particular applicability to lithographic printing. The present invention also relates to novel resins used in the preparation of such ink compositions and to methods of making and using such compositions and resins.

2. Summary of the Prior Art

A wide variety of printing processes currently exist in the art. Although it is contemplated that the ink composition and related resins will have applicability to most if not all of these processes, it has particular applicability to a lithographic printing processes commonly referred to as lithography. Lithography is a method of printing which relies on differences in solubility and surface wetability between an oil based component and an aqueous or aqueous based component to effectively transfer the printing ink to the desired image area and prevent it from transferring to the nonimage areas.

During conventional lithographic printing, an oil based ink composition and an aqueous fountain solution are applied to a printing plate. Because of the solubility and the wetability differences of the oil based and aqueous compositions, the fountain solution is preferentially attracted to and preferentially wets oleophobic nonimage areas, while the ink is preferentially attracted to and preferentially wets oleophilic image areas. It is well known and accepted in the art that successful lithographic printing requires inks which exhibit stability relative to water and thus remain water insoluble. Absence of this characteristic will result in poor print quality, poor edge definition, dot gain and various other print deficiencies. Thus, lithographic inks are selected and formulated for their ability to remain stable, cohesive and insoluble when contacted with water. The simultaneous feeding of the ink composition and fountain solution to the print plate is accomplished through a variety of methods and roller configurations known in the art.

During the course of lithographic printing, the printing plates are periodically changed as one job is completed and another started. Whenever this occurs, the blanket cylinder in an offset process must be cleaned to remove ink residue which is present from the previous job. Further, if a change of ink is desired, the entire print train including the application rollers, the print plate and the blanket must be cleaned. Such cleaning is commonly accomplished using an appropriately formulated wash solvent. To be effective as a wash solvent, the wash must be compatible with, or be able to dissolve or sufficiently disperse the ink. Since the inks are oil based or water insoluble, this necessitates the use of organic or petroleum based or other non-aqueous wash solvents to effectively remove the ink from the rollers, printing plates, blanket cylinder, etc.

These organic wash solvents can give rise to employee safety concerns and are a large source of both air and water pollution as volatile organic compounds (VOC's) are dispersed into the atmosphere or disposal systems. Such pollution is due to evaporation into the ambient air or into a venting system during the washing of the print components as well as the disposal or laundering of shop towels and rags used in the cleaning process. Attempts to develop water based wash or cleaning solutions have not been successful due to the inherent ability of the ink to resist water. Attempts have also been made to use water/solvent mixtures by emulsifying petroleum-based solvents into water through the use of emulsifiers and surfactants, but these products suffer from inherent instability due to immiscibility of water and the solvents and perform slowly. Further, such mixtures do not completely eliminate the use of petroleum solvents which are still commonly present in an amount of about 30–80%. Other industry trends include the use of solvents such as terpenes. While not petroleum based, their performance has been marginal and they are costly and in short supply. In addition, their use and disposal also pose environmental concerns.

Thus, although offset lithography is recognized and established as a dominant printing process for certain applications, drawbacks exist because of the pollution and disposal problems referred to above. These are becoming more of a drawback and more of a problem as new pollution control regulations and standards are mandated. In fact, because of the very nature of the lithographic process at least one of the components (either the ink composition or the fountain solution) must be oil based or water insoluble. This in turn necessitates the use of an organic or petroleum based solvent to wash the apparatus. This is generally accepted as a necessary limitation of the lithographic process about which little can be done.

For nonlithographic applications, certain water based or water soluble inks are currently available. Some of these utilize water dispersible or soluble resins which have been preneutralized to provide such properties. See for example U.S. Pat. No. 4,966,628 issued on Oct. 20, 1990 to Amos et al. and U.S. Pat. No. 4,154,618 issued on May 15, 1979 to Burke. While these inks can be cleaned up with water or water solutions and thus reduce pollution concerns, it is generally recognized that existing water soluble or dispersible inks exhibit inferior water and alkaline resistance as well as inferior drying, adhesion and gloss properties when compared to conventional solvent based inks.

Accordingly, there is a need in the art to address the above problems, while still providing an ink composition which, when printed, will result in highly acceptable print quality and durability.

SUMMARY OF THE INVENTION

In contrast to the prior art, the present invention relates generally to an oil based or water insoluble ink composition, or to an oil based composition usable in a lithographic process, in which such composition is substantially water insoluble and can be printed in its water insoluble form, but can be washed with an aqueous wash solution. Such compositions significantly reduce, if not eliminate, pollution and safety concerns while still maintaining highly acceptable print quality. In a nonlithographic application, the present invention relates to an oil based or substantially water insoluble ink which can be cleaned up with water. The invention also relates to the resins used in making the above ink compositions and to a method for making such resin and composition, a method of using the composition in a lithographic or other printing process and a method of recovering the composition residue after it has been washed or otherwise removed from the print apparatus.

A preferred embodiment of the present invention is based upon an improved oil based or water insoluble ink composition in which the solubility or washability of the composition relative to an aqueous or aqueous based solution can be selectively controlled, while at the same time exhibiting acceptable print quality and acceptable stability during printing. More specifically, the improved ink composition of the present invention is formulated so that its solubility or washability relative to an aqueous solution can be selectively controlled by varying the pH level of such solution. This facilitates the use of an aqueous fountain solution with a first alkaline pH level during the printing process in which the ink composition is stable and insoluble and can therefore print lithographically, and the use of an aqueous wash solution with a second, generally acidic pH level during clean up in which the ink composition is soluble or washable. Such an ink composition eliminates the need for organic or petroleum based or other nonaqueous cleaning or washing solvents which in turn minimizes or eliminates pollution and employee safety concerns, while still achieving acceptable print quality.

More simply stated, the preferred ink composition of the present invention must be water insoluble during printing, but be capable of becoming selectively soluble or washable in an aqueous acidic solution when cleanup is desired. Preferably, the composition includes a compatible, amine functional, water reducible component which functions to provide the composition with the desired solubility characteristics. A further preferable feature of the system is that the change from being water insoluble to being water soluble or washable occur quickly, under ambient conditions, and utilize wash solutions which are safe and cost effective.

The present invention also relates to novel amine functional water reducible resins which are compatible with the other components of the ink formulation and which function to provide the ink composition with selective water solubility behavior as a function of pH. Ink compositions which include such resins in accordance with the present invention are substantially water insoluble during printing under alkaline conditions, but can be converted to a substantially water soluble or washable form for clean up under acidic conditions.

Although the preferred embodiment contemplates an ink composition which is incorporated into the oil based or water insoluble component of a lithographic ink and a fountain solution which is aqueous based, these could be reversed. In such a case, the water solubility or washability of the oil based or water insoluble fountain solution would be changed when clean up is desired. It is also contemplated that the oil based ink composition of the present invention may have usefulness in print processes other than lithography, such as letter-press, gravure, flexography, intaglio and the like, if use of an oil based or water insoluble ink which can be cleaned up with an aqueous solution is needed or desired.

The method aspect of the present invention relates to the making of the amine functional resins and the making, using and recovery of an ink composition or oil based component of the type contemplated by the present invention. Specifically, the method of making the ink composition or component includes the steps of combining the various composition ingredients including a resin component or ingredient having selective aqueous solubility. The preferred method of making the ink composition or component involves formulating a resin component in which a portion, and in particular a solubility controlling portion, exhibits selective water solubility controlling portion, exhibits selective water solubility dependent on the pH of the solution with which it is contacted. The preferred solubility controlling portion is an amine functional, water reducible resin which is derived from an acid functional, water reducible alkyd, polyester or the like.

The preferred process of using the ink composition or component includes applying the substantially water insoluble ink composition to a printing plate or other print application equipment, transferring such ink composition to a desired print receiving substrate or medium and then cleaning up or washing the application equipment with an aqueous acidic solution. For lithographic printing, the process comprises the steps of applying the ink composition and a first aqueous solution comprising an aqueous fountain solution to a printing plate, transferring the ink composition to a receiving substrate or medium and then washing the printing plate, blanket and other print components with a second aqueous solution comprising an aqueous wash. In the preferred method, the first and second aqueous solutions have alkaline and acidic pH levels, respectively, the first in which the ink composition is insoluble and the second in which the ink composition is soluble, washable or dispersible.

Finally, the preferred method of recovering the ink composition or other oil based component residue front a printing apparatus and wash solution includes the steps of washing or removing the composition ink residue from a portion of the apparatus using an aqueous wash solution with an acidic pH level in which the ink composition is soluble or washable. This results in formation of a mixture comprised of ink residue and wash solution as well as soiled cleaning towels containing such mixture. The pH of such mixture is then changed to a level at which the ink composition is substantially water insoluble. This results in the ink composition precipitating into a removable form. The ink residue is then removed and recovered from such mixture by filtration, centrifugation or other techniques known in the art. The above process facilitates cleaning of the soiled towels and recovery of the wash solution and ink residue. This in turn facilitates recycling or more ready disposal of the wash solution and controlled disposal of the residue.

Accordingly, it is an object of the present invention to provide an oil based or water insoluble ink composition in which its solubility or washability relative to an aqueous medium can be controlled by selectively adjusting the pH of such aqueous medium.

Another object of the present invention is to provide an improved oil based or water insoluble lithographic composition for use as, or together with, a lithographic ink composition which can be washed with an acidic aqueous wash solution and which provides acceptable print quality.

Another object of the present invention is to provide an oil based component for a lithographic printing system in which the water solubility or washability can be selectively controlled by varying the pH of the solution which it contacts.

A further object of the present invention is to provide a method for making, using and recovering an oil based or water insoluble ink composition, and more particularly a lithographic ink composition, of the type in which the water solubility or washability can be selectively controlled.

A still further object of the present invention is to provide an amine functional water reducible resin usable in the ink composition of the present invention and a method of making such resin.

These and other objects of the present invention will become apparent with reference to the description of the preferred composition and method and the appended claims.

DESCRIPTION OF THE PREFERRED EMBODIMENT AND METHOD

The preferred embodiment of the present invention relates to oil based or water insoluble ink compositions and is described with respect to oil based or water insoluble lithographic compositions usable in a lithographic printing process. The present invention also relates to various methods involving the making, using and recovery of such compositions and to the water reducible resins used in the making of the ink compositions. As set forth above, lithography is based on the concept of providing a printing plate having oleophilic (oil attracting) and oleophobic (oil repelling) areas and providing an oil based or water insoluble component and an aqueous component to such printing plate whereby the oil based component is attracted to the oleophilic areas and the aqueous component is attracted to the oleophobic (or hydrophilic) areas. Conventional lithographic ink compositions are oil based, while the so-called fountain solutions are aqueous. This necessarily dictates use of an organic or other nonaqueous solvent when washing or cleaning the printing plates, rollers, blanket cylinder, ink train or other print components.

The preferred ink composition of the present invention is an oil based or water insoluble lithographic ink which is insoluble in water under certain conditions, but which can be selectively converted to exhibit water solubility or washability at certain other conditions. More specifically, the preferred ink composition is water soluble at certain selected pH levels while being water washable at certain selected other pH levels. As used herein, the term "washable" or "water washable" refers to a composition or component which can be removed or dispersed when exposed to certain aqueous solutions, including acidic solutions. It should be noted that in the present application "solubility" is not necessarily equated with "washability". A composition that is soluble would certainly be washable; however, the converse is not necessarily true. To be washable, a composition must be capable of removal or dispersion, either physically or through means of solubility.

Although the preferred ink composition of the present invention is oil based or water insoluble, it is contemplated that the concept of the present invention could also apply to a lithographic system in which the ink composition is aqueous based and the fountain solution is oil based or water insoluble. In such a system, the fountain solution would be water insoluble under certain conditions or at certain pH levels and water soluble or washable at certain other conditions or pH levels. It is also contemplated that an oil based or water insoluble ink composition in accordance with the present invention will also have applicability to print processes other than lithography, including letter-press, gravure, flexographic and intaglio, among others. Additionally, the inks of the present invention will be applicable to "waterless" lithography in which special plates are used which are treated to allow one to practice lithography without the use of a fountain solution. Accordingly, unless otherwise specifically stated, the present invention contemplates applicability to both a conventional oil based or water insoluble lithographic ink composition system as well as a possible water based lithographic ink composition system and also an oil based or water insoluble ink composition useful in print processes other than lithographic.

Conventional lithographic ink formulations comprise a variety of components or ingredients including a varnish or vehicle component, pigments, solvents or diluents and various additives. The pigments, solvents or diluents and additives provide the ink composition with certain desirable characteristics such as color, drying speed, tack, viscosity, etc. These may be considered optional, depending upon the particular characteristics desired. Pigments or coloring agents may include organic and inorganic pigments and dyes and other known colorants. Solvents or diluents are principally used to control viscosity, improve compatibility of other components, among others. Additives and other auxiliary components o may include, for example, waxes, greases, plasticizers, stabilizers, drying agents, supplemental drying agents, thickeners, fillers, inhibitors and others known to the art.

The major component of a lithographic ink composition is commonly referred to in the industry as the lithographic ink varnish or vehicle. A lithographic ink varnish or vehicle comprises two principal components: a resin component and an oil or diluent component. As used herein, the term resin is used in its broadest sense to include all natural and synthetic resins capable of functioning as a component in a printing or printing ink environment. In the ink composition of the present invention, the varnish, and in particular the resin component, is formulated to provide the ink composition with the characteristic of being selectively water insoluble at certain pH levels, namely alkaline, and water soluble or washable at other pH levels, namely acidic.

Lithographic ink varnishes may be divided into two major classes depending upon the system of curing or drying the inks. The first system is an oleoresinous system which is generally used to produce quick set, heat set, and various other drying inks which set or dry by oxidation, absorption of the oil into the substrate, or solvent evaporation. The second system is an acrylic system which employs ultraviolet, electron beam or other radiation curing techniques. In an oleoresinous system, the vehicle is comprised of resins and oils or solvents; in radiation curable inks, these are replaced by polymerizable components such as acrylate functional oligomers and monomers known in the art. In a radiation curable system, the monomers are commonly referred to and function as diluents. The concept of the present invention is applicable to both systems; however, the preferred composition is described with respect to an oleoresinous system.

The oil or diluent component of the ink composition or varnish of the preferred embodiment may be any one of a variety of oils or oil derivatives. Preferred diluents for use in the present invention include the fatty amines and in particular oleyl amine. Stearyl amine and oleyl diamine are other fatty amines which can be used. Vegetable and other oils such as linseed, soybean or soya, castor, dehydrated castor, corn, tung, carnuba and otticita oils may also be used. When vegetable oils are used, however, it is preferable for certain so called "coupling" or "bridging" resins to also be used as discussed below. Certain petroleum distillates or mineral oils can also be used in combination with or in lieu of the vegetable oils. An example of such a petroleum distillate is a solvent known as a Magie solvent which is a $C_{12}$ to $C_{16}$ hydrocarbon solvent. The oil or diluent component of the ink composition or varnish functions principally to dissolve and act as a carrier for the resin component. Thus, a principal requirement of the oil component is that it be compatible with, and therefore able to dissolve or be miscible with, the resin component. Preferably the oil or diluent component of the ink varnish should comprise about 10% to 90% by weight and most preferably about 30% to 70% by weight.

The resin component in a conventional lithographic ink composition or varnish as well as in the ink composition and varnish of the present invention functions, among other things, as a film former to bind the varnish and pigment together and, when the ink dries, to bind the same to the receiving substrate. The resin component also contributes to the properties of hardness, gloss, adhesion and flexibility of an ink and must be compatible with the oil or diluent component of the varnish.

The resin component of the ink composition in accordance with the present invention is comprised, at least in part, of a water reducible resin, and more particularly, an amine functional water reducible resin whose water solubility is a function of the pH of the solution to which it is exposed. As used herein, the term water reducible defines a property of a resin or composition which enables such resin or composition to be substantially water insoluble under certain conditions (preferably pH related) and capable of being or becoming water soluble or water washable or dispersible under certain other conditions (preferably pH related). In accordance with the preferred embodiment, the term "amine functional" water reducible defines a resin or composition having free amine groups in an amount sufficient to provide the resin or composition with water solubility behavior which is pH dependent. Thus, an amine functional water reducible resin is substantially water insoluble under alkaline conditions and water soluble or washable under acidic conditions. By formulating the resin component of the ink composition to include an effective quantity of an unneutralized amine functional water reducible resin, it has been found that under alkaline conditions, certain ink compositions can be formulated which remain sufficiently stable (i.e. sufficiently nonionic and water insoluble) to be useful as a lithographic ink and provide acceptable print quality. These compositions can then be readily and selectively converted to a water soluble or washable form upon a shift to acidic conditions. This selective solubility behavior allows the ink composition of the present invention to be printed in a substantially water insoluble form in combination with an alkaline aqueous fountain solution and cleaned up using an acidic aqueous wash solution.

The characteristics of a lithographic or other ink composition relating to water solubility or insolubility and stability are principally related to the resin component of the system. In accordance with the present invention, the resin component includes a solubility controlling portion comprising an amine functional water reducible resin which is substantially water insoluble under alkaline conditions and water washable under acidic conditions. By selecting the amine functional water reducible resin which is compatible with the other varnish components and which exhibits the desired selective solubility behavior, it has been found that the resulting resin component, varnish and ink composition exhibit similar characteristics.

It is contemplated that various formulations of amine functional water reducible resins can be utilized in the ink composition of the present invention and that various methods can be used to prepare and formulate such amine functional water reducible resins. In accordance with the preferred embodiment and method of the present invention, however, the amine functional water reducible resin is prepared as a derivative of commonly available acid functional water reducible resins.

Specifically, various acid functional water reducible resins exist in the art. These include, among others, water reducible alkyds (074-7451 of Cargill), water reducible polyesters (072-7203 of Cargill), water reducible polyolefins (073-7358 of Cargill) and water reducible epoxy esters (Chempol 10-0453 of Cook Composites). The above resins are acid functional water reducible resins which are substantially water insoluble under acidic conditions and water soluble or washable under alkaline conditions. Various other acid functional water reducible resins also exist or can be formulated by procedures known in the art. These acid functional resins include a sufficient number of free acid or carboxyl (COOH) groups to provide the resin with its water reducible characteristic. The extent of these free acid groups in a resin is defined by its acid number. The particular acid number needed for a resin to exhibit water reducible behavior, if such behavior is possible at all, will depend on the resin structure and various other factors. For certain alkyds and other resins known as acid functional water reducible resins, including those identified above, the acid numbers are in the range of about 25-200 and more preferably about 30-150.

Preparation of the amine functional water reducible resins usable in accordance with the present invention are prepared by combining a polyamine with an acid functional water reducible resin at sufficient temperatures and for a sufficient time to form an amine functional water reducible resin having amide linkages and free amine groups. Such reaction can be represented generically as follows:

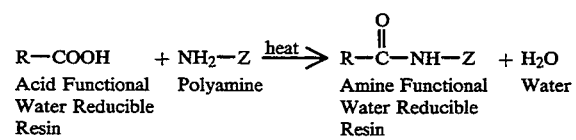

R—COOH + NH$_2$—Z $\xrightarrow{\text{heat}}$ R—C(=O)—NH—Z + H$_2$O
Acid Functional  Polyamine  Amine Functional  Water
Water Reducible            Water Reducible
Resin                       Resin Where R=alkyd, polyester, polyolefin, or epoxy ester backbone
Where Z=mono or greater amine During the above reaction, the amine groups of the polyamine react with the carboxyl (COOH) groups by amidification to produce an amine functional water reducible resin with amide linkages plus water. This reaction results in the lowering of the acid number of the resin (due to the reaction of the carboxyl groups into amide linkages) and a corresponding increase in the amine number of the resulting resin. Preferably, the amine number of the resulting resin should be at least 30 and more preferably at least 40 and should exhibit water reducible behavior. It is contemplated that a variety of polyamines can be utilized in the above reaction. In the preferred embodiment, however, the polyamine comprises at least a diamine and preferably a triamine or tetramine. Most preferably the polyamine comprises diethylene triamine or triethylene tetramine.

The above reaction is carried out at a temperature and for a time period sufficient for the reaction to occur. For reactions involving the preferred diethylene triamene and triethylene tetramine, the reaction temperatures vary from about 300° F. (149° C.) to about 450° F. (232° C.). The reactions involving such preferred amines are allowed to proceed at the above temperatures and with mixing for a period of between about 7 hours to about 24 hours. The specific and optimum temperatures, reaction times and other parameters, however, will vary depending upon the particular acid functional water reducible resin and amines involved and the degree of reaction desired. Preferably, the amount of amine combined with the acid functional water reducible resin should be sufficient to fully react with all of the free acid groups of the resin, however, full reaction of the amine groups with the acid groups is not necessary and will normally not occur. For the triamines, three equivalent amines per one equivalent acid group is used. This results, in theory, in one amide linkage and two free unreacted amine groups per equivalent acid group. For tetramines, four equivalents per one equivalent acid group are used, resulting in one amide linkage and three unreacted amine groups per acid group. If an excess of amine is used, or if the amine is not fully reacted, the majority of the excess or unreacted amine can be removed by vacuum distillation, if desired. The examples set forth below show the preparation of a variety of amine functional water reducible resins prepared from a variety of acid functional water reducible resins at the conditions specified therein. In general, the amine functional water reducible resins produced by this process are hard, solid compositions at room temperature which are soluble in acidic solutions, but insoluble in alkaline solutions.

Preparation of ink compositions with the amine functional water reducible resins described above includes combining such resin with compatible oils or diluents and cooking the same until the materials are melted and the resin is dissolved. The specific amount of resin and oils or diluents, the temperature and duration of cooking, etc. will depend on various factors including the resin and oil components used, the desired viscosity and the type of printing for which the ink is to be used, among others. In general, cooking of the components at temperatures of about 250° to 450° F. (121° to 232° C.) for 10 to 20 minutes will be sufficient. After cooking, pigment is added and the mixture is milled until the pigment is fully dispersed.

Preferably, the diluent comprises fatty amines which are compatible with the selected resin. Examples include oleyl amine, stearyl amine and oleyl diamine, with oleyl amine being most preferred. Other oils or diluents which may be used include compatible vegetable and other oils as described above and certain petroleum distillates or mineral oils. When the oil or diluent component is comprised of one or more fatty amines, either alone or in combination with a petroleum distillate, the amine functional water reducible resin can comprise a wide variety of such resins having a relatively wide range of amine functionality. Such amine functionality is defined by an amine number preferably at least 30 and more preferably at least 40.

When vegetable oils are used, it has been found that a bridging or coupling resin is needed to provide compatibility between the vegetable oil and the amine functional water reducible resin. For example, although the combination of an amine functional water reducible resin and a fatty amine such as oleyl amine are fully compatible and will result in a clear and stable varnish, addition of a vegetable oil as part of the diluent results in a varnish which is cloudy and unstable. However, by adding a bridging or coupling resin together with the vegetable oil, the varnish clears and stabilizes. Preferably, such bridging or coupling resins are those similar in structure to the amine functional water reducible resins of the present invention, but which still retain sufficient acid functionality to preclude them from full water reducible behavior, i.e., being substantially water insoluble at alkaline conditions and water soluble or washable at acidic conditions. Thus, such bridging or coupling resins should preferably be those which are acid functional water reducible resins in which the replacement of the acid groups by the amine groups is not sufficient to render the resin insoluble at alkaline conditions. Preferably the acid number of the bridging or coupling resins should be at least about 20. It has been shown that the water reducible alkyd of Cargill (074-7451) functions acceptably as a bridging or coupling resin in its unmodified form with an acid number of about 50 and in its partially amidified form with an acid number of 31.7, but not in its more fully amidified form with an acid number of 11.1.

The amount of bridging or coupling resin needed for an equivalent amount of vegetable oil will depend on a variety of factors including the resins and oils employed and the other varnish components, among others. In general, however, the weight percent of coupling resin in the varnish should be at least about 20% and more preferably at least about 50% of the weight percent of vegetable oil in the varnish. Notwithstanding, the preferability of utilizing a bridging or coupling resin together with vegetable oils, the overall acid number of the varnish formulation should be kept to a minimum. This produces a varnish which (for lithographic applications) is less reactive with alkaline fountain solutions and more reactive with acidic washes.

For the solubility controlling portion of the resin component to cause the resulting varnish or ink composition to exhibit the desired water solubility characteristics or behavior, such solubility controlling portion must be present in an amount effective to result in such behavior. This will depend to some extent on the particular amine functional water reducible resins employed. Preferably such amine functional water reducible resin should be present in an amount of at least about 5% and more preferably between about 5-60% by weight of the varnish (the resin and oil or diluent components). Most preferably, the amine functional water reducible resin should be present in an amount of at least about 10% or about 10-60% by weight.

It is also contemplated that in accordance with the preferred embodiment, the solubility controlling portion, and in particular the amine functional water reducible resin, may comprise either a single amine functional water reducible resin or a blend of two or more such resins which exhibit the desired water solubility characteristics or behavior of being substantially water insoluble under alkaline pH levels and water soluble or washable under acidic pH levels.

The resin component of the ink composition of the present invention may also include other non-water reducible resins, such as the bridging or coupling resins described above, provided such other resin components, the amine functional water reducible resins and the oil or diluent components are compatible with one another.

For the amine functional water reducible resins and for the ink compositions or varnishes incorporating such resins, water solubility or washability characteristics depend on the pH of the aqueous solution with which such compositions come into contact. Using the preferred amine functional water reducible resins of the present invention, such resins and the resulting compositions or varnishes are water insoluble at an alkaline pH level greater than 7.0. Preferably the pH of the solution at which the composition will come into contact in its water insoluble form is about 7.5 to 14.0 and most preferably about 11.5 to 13.0. The pH level at which the amine functional water reducible resin and resulting ink composition or varnish becomes water soluble or washable is an acidic pH having sufficient acid strength to substantially neutralize the amine groups of the amine functional water reducible resin. Preferably such pH is about 1.5 to 4.5 and most preferably about 2.3 to 4.0.

The ink composition or varnish in accordance with the present invention includes an excess of amine groups by virtue of the presence of the unneutralized amine functional water reducible resin. In some ink composition formulations, certain compatible other components can be selected which contain functional groups which react with or tie up the free amine groups of the amine functional water reducible resin. Generally, such effect is minimal. In any event, the amine functional water reducible resin, after combination with the other ink or varnish components, must have sufficient amine functionality to result in the desired solubility behavior.

Addition of a source of hydrogen ions to the above ink composition or varnish results in the solubility controlling portion, and thus the ink composition, being converted to a water soluble or at least a water washable or dispersible form. Such source of hydrogen ions is provided in accordance with the present invention by an acidic wash solution. The acidic strength of such wash should be sufficient to render the solubility controlling portion, and thus the ink composition, water washable or dispersible at normal operating or ambient temperatures. Although the applicants do not wish to be held to any particular explanation of this conversion, it is believed that the hydrogen ions react with or neutralize the free amine groups of the amine functional water reducible resin and other functional materials in the varnish, thereby rendering the same water washable or dispersible. This behavior of the solubility controlling portion is then sufficient to render the entire ink composition water washable or dispersible. The present invention contemplates an ink composition which is substantially water insoluble at alkaline pH conditions and is printed at those conditions. Thus, the amine functional water reducible resins used in the composition should not be preneutralized, but should exist in the ink composition in their unneutralized or substantially unneutralized form. By being unneutralized, the resins exhibit the required water reducible behavior and minimize interactions with the fountain solution during a lithographic application.

In general, the more acidic the wash solution, the quicker and more effective the ink composition will be removed or dispersed. As set forth above, a wash solution with a pH of about 1.5 to 4.5 and preferably about 2.3 to 4.0 is effective to clean up blanket cylinders and rollers containing ink compositions of the present invention by use of a rag or towel dipped in the wash solution.

A wide range of acidic cleaning agents or wash solutions can also be employed with the inks and ink compositions of the present invention. The principal property of such solutions is that they have a pH or source of hydrogen ions sufficient to convert the solubility controlling portion, and thus the ink composition to a water soluble or washable condition. The preferred wash solution contains acetic acid as the hydrogen ion source; however, various other acidic solutions can be used as well including, without limitation, solutions of formic acid, propionic acid, butyric acid, and hydrochloric acid.

Although the preferred embodiment has been described specifically with respect to the water solubility control of an amine functional water reducible resin component, it is contemplated that multiple components of the resin system, including the entire resin component itself, may be selected to provide the desired water solubility characteristics. In accordance with the present invention, however, such portions or components must be compatible with each other and with the remainder of tile system, must meet the other requirements of the lithographic or other print system including print quality requirements and must, after combination with the other composition components, exhibit aqueous solubility changes in response to changes in pH of the solution with which it is contacted.

The particular pigments, solvents, diluents and other common additives do not appreciably affect the effective free amine associated with the solubility controlling portion and thus tile water solubility/insolubility behavior of the resulting ink composition.

Fountain solutions useful with the ink composition of the preferred embodiment include all commercially available alkaline solutions. Preferably, such solutions should be chosen which have a working strength pH of 10.0 or greater, and more preferably of about 12.0 or greater. Additionally, certain fountain solution additives, such as isopropyl alcohol, antipiling additives and the like can be used successfully with the compositions of the present invention.

In addition to the lithographic ink composition or varnish described above, the present invention relates to various methods based upon an ink composition or varnish which is water insoluble at certain conditions and water soluble or washable at certain other conditions. Specifically, the method aspects of the present invention include a method or process for making an ink composition or varnish, a method or process of printing and a method or process of making the amine functional water reducible resin usable in the present invention.

The method of making an ink composition in accordance with the present invention comprises the steps of combining an oil or diluent component and a resin component wherein such resin and oil components are compatible and wherein the resin component is selected and formulated to be substantially water insoluble at certain conditions and water soluble or washable at certain other conditions. More specifically, the above method involves a resin having a solubility controlling portion, and preferably an amine functional water reducible resin component in which the water solubility of such resin is such that it is substantially water insoluble at certain alkaline pH conditions and water soluble or washable at certain other acidic pH conditions. Most preferably the water reducible resin is an amine functional water reducible resin derived from an acid functional water reducible alkyd or polyester.

The method aspect of the present invention also relates to a method of printing and in particular a method of lithographic printing. Generally, such method includes applying the substantially water insoluble ink of the present invention to a printing plate or other print application equipment, transferring such ink to a desired print receiving substrate or medium and then cleaning up or washing the printing plate or other application equipment using an aqueous acidic wash. For lithographic printing, the method includes applying an oil based component and a water based component to a printing plate in which one of the components is an ink composition and the other is a fountain solution, transferring the ink composition to a desired medium, and then washing the oil based component with a wash solution having a pH different than that of the water based fountain solution. More specifically such method includes the steps of first applying an oil based lithographic ink composition and an aqueous fountain solution to a lithographic printing plate in which the ink composition is water insoluble at alkaline pH conditions and water soluble or washable at acidic pH conditions and in which the aqueous fountain solution has a selected alkaline pH in which the oil based lithographic ink composition is generally insoluble. The printing plate has oleophilic and oleophobic areas to receive the ink composition and the aqueous fountain solution, respectively. The ink composition which is received by the oleophilic areas of the printing plate is then transferred from the printing plate to a receiving medium. This can be a sheet of paper or other substrate such as in a direct printing method or can be a blanket positioned on a cylinder such as is common in an offset method.

The final step in the method of using the lithographic ink composition is to wash or clean the printing press or other print components with an aqueous wash solution having a selected acidic pH at which the ink composition is soluble or washable. Preferably, the fountain solution is alkaline with a pH of 10.0 or greater, more preferably of 11.0 or greater and most preferably of about 12.0 or greater. The wash solution is acidic with a pH of 4.5 or less, preferably of 3.5 or less and most preferably of about 2.5 or less.

A further aspect of the method of the present invention is a method of recovering the ink composition residue from a printing apparatus, preferably for disposal purposes. Such recovery method can be used in any printing process to recover the oil based component or the residue thereof, but has particular applicability to a lithographic process which utilizes an oil based lithographic ink composition which is water insoluble at selected first pH levels and water washable at selected second pH levels. The recovery method is applied after the lithographic process has been completed, such as when an ink change or printing plate change is desired. The process includes removing the lithographic ink residue front portions of the print apparatus. Such apparatus can include one or more of the ink train, the printing plate, the rollers, the blanket cylinder or various other components which are exposed to the ink composition. The ink residue is removed using an aqueous wash solution with a pH effective to convert the ink composition, and thus the ink residue, to a water soluble or water washable form. In the preferred method, the wash solution is acidic and has a pH of 7.0 or less, preferably of 3.5 or less and most preferably of about 2.5 or less. Application of the wash to the blanket is commonly accomplished with a shop towel dipped in the wash solution.

The washing step results in the formation of a mixture of ink residue and wash solution. The pH of this mixture is then modified to a pH which is generally alkaline and effective to render the ink residue water insoluble. This results in the ink residue precipitating or otherwise separating from the water phase and facilitates removal of the residue through centrifugation, filtration or various other techniques known in the art. In the preferred recovery process, the mixture is modified to an alkaline pH of about 7 or greater and more preferably of about 8 to 12. The wash from which the residue has been removed can then preferably be readjusted to the desired acidic pH and reused as wash solution. The shop towels which contain ink residue can also be cleaned in a similar manner to remove the ink residue.

The amine functional water reducible resin usable in the present invention is derived from an acid functional water reducible resin. The method of making such resin includes combining an acid functional water reducible resin with an amine. Such amine must be at least a diamine and preferably a triamine or a tetramine. The acid functional water reducible resin and the amine are combined at a temperature and for a reaction time sufficient for the formation of the amine functional water reducible resin as provided in the examples below.

Having described the details of the preferred composition and methods, the following examples will demonstrate the applicability of the present invention to the formulation of a variety of amine functional water reducible resins and the formulation and use of a variety of ink compositions. Unless otherwise specified all percentages are "by weight".

Example 1 represents preparation of a bridging or coupling resin, while Examples 2–5 represent examples of preparing an amine functional water reducible resin from an acid functional water reducible resin.

Example 1

A bridging or coupling alkyd resin having both amine and acid functional groups was prepared as follows: A reaction mixture comprised of 0.134 equivalents (150 grams) of an uncut (no solvents) Cargill water reducible short oil alkyd (No. 074-7451 with an Acid Number of 47–53) and 0.401 equivalents (13.8 grams) of diethylene/triamine was charged to a 500 ml round-bottom, three neck flask fitted with a thermometer, mechanical stirrer and Claisen distilling head with a condenser. The mixture was stirred and the temperature was raised to 315° F. (157° C.) within one hour and 15 minutes under nitrogen. The mixture was held at 309°–315° F. (154°–157° C.) for an additional 4 hours and 45 minutes. After cooling, a brown, hard, solid resin resulted. This resin showed no solubility in pH 4 aqueous solution. In pH 11 this resin showed slight solubility by a partial breakdown. The acid number of the resulting resin was measured to be 31.7.

Example 2

A mixture of 0.134 equivalents (150 grams) of the Cargill short oil alkyd of Example 1 and 0.535 equivalents (19.6 grams) of triethylene tetramine was charged to a 500 ml round bottom, three neck flask fitted with a thermometer, mechanical stirrer, condenser and a Barrett receiver. Under nitrogen the mixture was brought to 300° F. (149° C.) within 30 minutes. For the remaining 14½ hours, the reaction temperature was held at 300°-305° F. (149°-152° C.) to allow for amide formation. After cooling, a brown, hard, solid amine functional resin resulted. Such resin was shown to be substantially insoluble in an alkaline aqueous solution (pH 11) and soluble in an acidic aqueous solution (pH 3.5). The acid number of the resulting resin was measured to be 9.3.

Example 3

A mixture of 0.305 equivalents (300 grams) of Cargill short oil alkyd of Example 1, 1.734 equivalents (63.4 grams) of triethylenetetramine and three drops of 85% phosphoric acid was charged to a 1000 ml round-bottom, three neck flask fitted with a thermometer, mechanical stirrer, 75° angled adapter and condenser and a Barrett receiver. The mixture was stirred and heated to 395° F. (202° C.) within two hours. The mixture was maintained at 400°-410° F. (204°-210° C.) and stirred for an additional 21 hours. At this point a vacuum (10-15 mm Hg) was applied for the final one hour to remove excess unreacted amine, during which the reaction mixture temperature increased to 450° F. (232° C.). After cooling, a glassy brown, hard, solid, amine functional resin resulted. Such resin was shown to be substantially insoluble in an alkaline aqueous solution (pH 11) and soluble in an acidic aqueous solution (pH 3.5). The acid number was measured to be 9.3.

Example 4

A mixture of 0.1471 equivalents (187.5 grams) of a Cargill long oil acid functional water reducible alkyd (No. 074-7416) with an Acid Number of 53-58, 0.8382 equivalents (30.65 grants) of triethylene tetramine and 3 drops of 85% phosphoric acid was charged into the apparatus described in Examples 2 and 3. The mixture was brought to a temperature of 305° F. (152° C.) within one hour. The temperature increased to 335° F. (168° C.) in the next one hour. The mixture was held at 330°-335° F. (166°-168° C.) for eight hours with the final hour being subjected to vacuum conditions of 10-15 mm Hg to remove unreacted amine. A semi-solid, brown, viscous amine functional resin resulted. Such resin was shown to be substantially water insoluble m an alkaline aqueous solution (pH 11) and water soluble in an acidic aqueous solution (pH 3.5). The acid number was measured to be 9.2.

Example 5

To remove a majority of the solvents, a vacuum (10-15 mm Hg) was applied to 0.1471 equivalents (200 grams) of a Cargill acid functional water reducible polyester solution (No. 072-7203 with an Acid Number of 50-60) for 1½ hours while the temperature increased to 250° F. (121° C.). This solvent stripped resin was then combined with 0.8382 equivalents (28.83 grams) of diethylene triamine and three drops of 85% phosphoric acid ($H_3PO_4$). The mixture was stirred and cooked from 250° F. to 330° F. (166° C.) in the next two hours. A temperature of 330°-335° F. (166°-168° C.) was maintained for the next 17 hours. A vacuum of 10-15 mm Hg was applied for an additional 1½ hours. A glassy, brown, hard, solid amine functional resin resulted. Such resin was shown to be substantially water insoluble in an alkaline aqueous solution (pH 11) and soluble in an acidic aqueous solution (pH 4). The acid number was measured to be 11.2.

Examples 6-14 show the preparation and lithographic printing and aqueous clean up of a variety of ink compositions prepared using the amine functional water reducible resins prepared in accordance with Examples 1-5. In Examples 6-14, the ink compositions were prepared by cooking all components of the varnish (no pigments) to about 250°-300° F. (121°-149° C.) for 15 minutes or until all materials melted and combined. The oleyl amine of each of the examples was Adogen 172 from Witco/Sherex Chemical Company. After cooking, the varnish was cooled and pigment was added while the mixture was stirred. The ink composition was then milled on a 3 roll mill with 3-4 passes.

The ink compositions of Examples 6-14 were each printed and evaluated using an A. B. Dick 375 offset press. The plates were Kodak aluminum (Product Code 2984) plates. The fountain solution in each case was a mixture of Varn Premier Edition Alkaline Concentrate (Produce Code 5013088) and tap water. The press was run at 6,500 impressions per hour. Approximately 25 to 50 grams of the ink composition were put into the press ink fountain. The rollers were inked up to a thickness of 0.6 to 1.2 mil and approximately 10 oz. of the prepared alkaline fountain solution was added to the press fountain tray.

Example 6 demonstrates an ink that uses a tetramine modified acid functional short oil alkyd of the resin synthesis of Example 2.

Example 6

| | |
|---|---|
| Oleyl Amine (Adogen 172 Witco Chem) | 44% |
| Amine modified resin of Example 2 | 36% |
| Carbon black (Cabot Regal 400R) | 20% |

Press Conditions

Dampener: Deluxe
Dampening Roller: Ceramic
Fountain Solution: 16 ounces Varn Premier Edition mixed with 112 ounces tap water
Wash Solution: pH 2.38 acetic aqueous solution
Ink Film: 0.7 mil 100 sheets were printed with the ink of Example 6. Dark print with no tinting was achieved. Blanket was cleaned acceptably using the acidic aqueous wash solution. Rollers were cleaned easily in 2 minutes and 45 seconds using the same solution.

In Ink Example 7, another tetramine modified acid functional alkyd (Example 3) was incorporated into an ink. This resin was purified by removing excess unreacted amine by vacuum distillation.

Example 7

| | |
|---|---|
| Oleyl Amine (Adogen 172 Witco Chem) | 41.5% |
| Amine modified resin Example 3 | 38.5% |
| Carbon black (Cabot Regal 400R) | 20.0% |

Press Conditions

Dampener: Deluxe
Dampening Roller: Ceramic
Fountain Solution: 48 Ounces Varn Premier Edition and 80 ounces tap water
Wash Solution: pH 2.38 acetic aqueous solution
Ink Film: 1.1 mil Again, 100 sheets were produced with acceptable print quality showing Example 7 can print lithographically. The blanket and the rollers (2 minutes 45 seconds) were both cleaned acceptably using the acidic aqueous wash solution.

Example 8 demonstrates the use of a traditional ink oil (Magie solvent 60).

Example 8

| | |
|---|---|
| Oleyl Amine (Adogen 172 Witco Chem) | 28% |
| Magie solvent 60 | 16% |
| Amine modified resin of Example 3 | 36% |
| Carbon black (Cabot Regal 400R) | 20% |

Press Conditions

Same as Example 7 except:
Ink Film: 0.8 mil 100 dark sheets were printed with no tinting. The blanket was acceptably cleaned using the acidic wash. An additional 100 dark, clean sheets were printed. The blanket was acceptably cleaned and the rollers were acceptably cleaned in 3 minutes 15 seconds using the acidic wash.

Examples 9, 10 and 11 demonstrate the use of various vegetable oils together with the coupling resin of Example 1. Stable varnishes were produced. For press conditions, Examples 9, 10 and 11 follow Example 7 except for ink films and wash solutions. Example 9 uses the acidic wash as in the previous examples. Example 10 uses the acidic wash with a nonionic surfactant (Mazawet 77), and Example 11 demonstrates the use of the surfactant acidic wash and a co-solvent (ethylene glycol monobutyl ether).

Example 9

| | |
|---|---|
| Oleyl Amine (Adogen 172 Witco Chem) | 25.9% |
| Linseed Oil (#00 Reg) | 17.3% |
| Amine modified resin of Example 1 | 15.3% |
| Amine modified resin of Example 3 | 19.5% |
| Carbon black (Cabot Regal 400R) | 22.0% |

Press Conditions

Wash Solution: pH 2.38 acetic aqueous solution
Ink Film: 0.7 mil 100 lithographically printed sheets were produced with acceptable print quality using ink of Example 9. The blanket was cleaned acceptably and another 100 sheets were printed. Blanket was cleaned acceptably and the rollers cleaned in an acceptable 3 minutes and 15 seconds with the acetic wash.

Example 10

| | |
|---|---|
| Oleyl Amine (Adogen 172 Witco Chem) | 27.4% |
| Soybean Oil | 15.0% |
| Amine Modified Resin of Example 1 | 10.4% |
| Amine Modified Resin of Example 3 | 26.5% |
| Carbon Black (Cabot Regal 400R) | 20.8% |

Press Conditions

Wash Solution: pH 2.38 acetic aqueous solution mixed with 4% (by weight) nonionic surfactant (Mazawet 77)
Ink Film: 1.1 mil The ink of Example 10 was used to produce 100 lithographically printed sheets. The blanket was cleaned using the wash solution. An additional 100 sheets were printed, the blanket was cleaned and the rollers were washed acceptably in 3 minutes and 30 seconds using the acetic/surfactant aqueous wash solution.

Example 11

| | |
|---|---|
| Oleyl Amine (Adogen 172 Witco Chem) | 29.8% |
| Castor Oil (United Catalysts USP Grade) | 14.4% |
| Amine Modified Resin of Example 1 | 9.1% |
| Amine Modified Resin of Example 3 | 25.5% |
| Carbon Black (Cabot Regal 400R) | 21.2% |

Press Conditions

Wash Solution: pH 2.38 acetic aqueous solution plus 4% nonionic surfactant (Mazawet 77) plus 3% ethylene glycol monobutyl ether.
Ink Film: 1.2 mil 100 sheets were produced with acceptable print quality. Blanket was cleaned acceptably using wash solution. Another 100 acceptable sheets were produced. The blanket and rollers (4 minutes) were cleaned acceptably using above wash solution.

In Example 12, an ink was produced that used a tetramine modified long oil acid functional water reducible alkyd.

Example 12

| | |
|---|---|
| Oleyl Amine (Adogen 172 Witco Chem) | 55.4% |
| Amine Modified Resin of Example 4 | 24.6% |
| Carbon Black (Cabot Regal 400R) | 20.0% |

Press Conditions

Same press conditions as Example 7 except:
Ink film: 0.7 mil

Ink of Example 12 produced 100 lithographically printed sheets. Blanket was cleaned easily using wash solution and rollers needed 3 minutes for an acceptable wash using the acidic aqueous wash solution.

Example 13 illustrates an ink produced using a paraffinic mineral oil.

Example 13

| | |
|---|---|
| Oleyl Amine (Adogen 172 Witco Chem) | 25.9% |
| Paraffinic Mineral Oil | 17.3% |
| Amine Modified Resin of Example 1 | 15.3% |
| Amine Modified Resin of Example 3 | 19.5% |
| Carbon Black (Cabot Regal 400R) | 22.0% |

Press Conditions

Press conditions were the same as in Example 8 except:
Ink Film: 0.8 mil

Again, 100 dark, clean acceptable sheets were printed using the ink of Example 13. Blanket cleaned easily and rollers washed acceptably in 2 minutes and 45 seconds using the acidic aqueous was solution.

Example 14 demonstrates the use of a triamine modified acid functional water reducible oil-free polyester. Also a Dahlgren Chem Series dampener was used with a chrome dampening roller.

Example 14

| | |
|---|---|
| Oleyl Amine (Adogen 172 Witco Chem) | 40.6% |
| Amine Modified Resin of Example 5 | 37.4% |
| Carbon Black (Cabot Regal 400R) | 22.0% |

Press Conditions

Dampener: Dahlgren Chem Series
Dampening Roller: Chrome
Fountain Solution: Same as Example 7
Wash Solution: Same as Example 7
Ink Film: 1.0 mil 100 dark imaged lithographically printed sheets were produced using the ink of Example 14. The blanket cleaned well and the rollers cleaned acceptably in 2 minutes 45 seconds using the acidic aqueous wash.

Examples 15-18 illustrate the clean-up and recovery of ink compositions and varnishes of the present invention. In Example 15, an ink composition identical to the formulation of Example 13 was prepared in accordance with the procedure of Examples 6-14. In Examples 16-18, an ink varnish identical to the formulation of Example 13 (without pigment) was prepared in accordance with the procedure of Examples 6-14.

In each of Examples 15-18, 1.44 molar acetic acid solution at a pH of 2.38 was used as the wash solution. The ink/varnish solutions of Examples 15-18 were each combined with the acetic acid wash by shaking the ink or varnish with the acetic acid wash vigorously until dispersion of the ink composition or varnish was substantially complete. The analysis was conducted on a 1.00% by weight ink or varnish acetic acid wash solution. In each of these examples, a modified version of the USEPA Method 413.1 was used.

In Examples 15-17, the pH of the ink or varnish solutions was raised by adding a pre-determined amount of solid sodium hydroxide sufficient to raise the pH to above 12.0 and to cause the ink or varnish to precipitate out of solution. The USEPA Method 413.1 was then followed without modification. Example 18 did not use a pH change. Following pre-treatment with sodium hydroxide, the mixtures of Examples 15-17 were filtered through #2 Whatman filter paper in a Buchner funnel using a vacuum. In Example 17, a filter aid (diatomaceous earth) was added to the Buchner funnel to improve separation. No pretreatment or filtration was conducted in Example 18. For each example, the color was noted and pH was measured on the filtrate before the USEPA method was employed.

Example 15

(Raise pH-Pre-Filter)

| | |
|---|---|
| Waste water sample: | 1.00% ink by weight ink solution, pH = 2.38 |
| Ink concentration: | 10,000 mg/L |
| Pre-treatment: | Raise pH to 12.79 using NaOH, filter through #2 Whatman paper |
| Color of filtrate: | Clear, yellow tint |
| Oils, greases, fat analysis: | 247 mg/L |
| Theoretical separation: | $\frac{.78(10,000) - 247}{.78(10,000)} \times 100 = 96.8\%$ |

Example 16

(Raise pH-Pre-Filter)

| | |
|---|---|
| Waste water sample: | 1.00% varnish, pH = 2.38 |
| Varnish concentration: | 10,000 mg/L |
| Pre-treatment: | Raise pH to 12.89 using NaOH, filter through #2 Whatman paper |
| Color of filtrate: | Slightly cloudy, yellow tint |
| Oils, greases, fat analysis: | 219 mg/L |
| Theoretical separation: | $\frac{10,000 - 219}{10,000} \times 100 = 97.8\%$ |

Example 17

(Raise pH-Add 5% Filter Aid-Pre-Filter)

| | |
|---|---|
| Waste water sample: | 1.00% varnish, pH = 2.38 |
| Varnish concentration: | 10,000 mg/L |
| Pre-treatment: | Raise pH to 13.25 using NaOH add 5% Hyflo supercal, pre-filter |
| Color of filtrate: | Clear, yellow tint |
| Oils, greases, fat analysis: | 55 mg/L |
| Theoretical separation: | $\frac{10,000 - 55}{10,000} \times 100 = 99.5\%$ |

Example 18

(No Pre-Treatment)

| | |
|---|---|
| Waste water sample: | 1.00% varnish, pH = 2.38 |
| Varnish concentration: | 10,000 mg/L |
| Pre-treatment: | None |
| Color of filtrate: | N/A |
| pH of filtrate: | N/A |
| Oils, greases, fat analysis: | 7,330 mg/L |
| Theoretical separation: | $\frac{10,000 - 7,330}{10,000} \times 100 = 26.7\%$ |

In Example 18, much of the varnish seemed to stick to the funnel walls and filter.

Although the description of the preferred composition and method have been quite specific, it is contemplated that various modifications could be made without deviating from the spirit of the present invention. Accordingly, it is intended that the scope of the present invention be dictated by the appended claims rather than by the description of the preferred composition and methods.

We claim:

1. A substantially water insoluble ink composition comprised of a resin component wherein said resin component includes a solubility controlling component comprising a water reducible resin whose water solubility is pH dependent and is present in an amount sufficient to cause said ink composition to be water insoluble at an alkaline pH and water washable at an acidic pH having sufficient acid strength to convert said water reducible resin to a water washable form.

2. The ink composition of claim 1 wherein said water reducible resin is an amine functional water reducible resin.

3. The ink composition of claim 2 being a lithographic ink composition.

4. The ink composition of claim 1 including an ink varnish comprised of said resin component and an oil or diluent component compatible with said resin component, wherein said water reducible resin is present in an amount of at least about 5% by weight of said ink varnish.

5. The ink composition of claim 4 wherein said water reducible resin is present in an amount of about 5% to 60% by weight of said ink varnish.

6. The ink composition of claim 5 wherein said water reducible resin is present in an amount of about 10% to 60% by weight of said ink varnish resin.

7. The ink composition of claim 2 wherein said water reducible resin is derived from one or more of an acid functional water reducible alkyd, polyester, polyolefin and epoxy ester.

8. The ink composition of claim 7 wherein said water reducible resin is derived from at least one acid functional water reducible alkyd.

9. The ink composition of claim 1 wherein said water reducible resin is substantially unneutralized.

10. The ink composition of claim 1 being an oil based ink composition and including a diluent compatible with said resin component.

11. The ink composition of claim 10 wherein said diluent includes a fatty amine.

12. The ink composition of claim 11 wherein said fatty amine is one of oleyl amine, stearyl amine and oleyl diamine.

13. The ink composition of claim 10 wherein said diluent includes a vegetable oil and said resin component further includes a coupling resin comprised of a compatible resin having an acid number at least about 20.

14. An oil based composition for use in a lithographic printing system comprising a resin component and an oil component compatible with said resin component, wherein said resin component includes an amine functional water reducible resin whose water solubility is pH dependent and is present in an amount sufficient to cause said composition to be substantially water insoluble at an alkaline pH and water washable at an acidic pH having sufficient acid strength to convert said water reducible resin to a water washable form.

15. The composition of claim 14 comprising an ink varnish having said oil and resin components wherein said water reducible resin is present in an amount of at least about 5% by weight of said varnish.

16. The composition of claim 15 wherein said water reducible resin is derived from an acid functional water reducible alkyd.

17. A method for making a substantially water insoluble ink composition comprising the steps of combining an oil or diluent component and a compatible resin component, wherein said resin component includes a solubility controlling portion comprising an amine functional water reducible resin which is substantially water insoluble at an alkaline pH and water washable at an acidic pH of sufficient acidic strength to substantially neutralize the water reducible resin.

18. The method of claim 17 wherein said water reducible resin is present in an amount of at least about 5% by weight.

19. The method of claim 18 wherein said water reducible resin is derived from an acid functional water reducible alkyd.

20. The method of claim 17 wherein said ink composition is a lithographic ink composition.

21. A method of printing comprising the steps of:
applying a substantially water insoluble ink composition to printing equipment wherein said ink composition is substantially water insoluble at alkaline conditions and water washable at acidic conditions;
transferring said ink composition to a receiving substrate and washing said printing equipment with an acidic wash solution.

22. A method of lithographic printing comprising the steps of:
applying an oil based component and an aqueous component to a lithographic print apparatus including a printing plate, said printing plate having oleophilic and oleophobic areas to receive said oil based component and aqueous component, respectively, one of said oil based and aqueous components being an ink composition and the other being a fountain solution, said oil based component being substantially water insoluble at alkaline pH levels and water washable at acidic pH levels and said aqueous component having an alkaline pH;
transferring said ink composition to a receiving medium; and
washing at least a portion of said print apparatus with an aqueous wash solution having an acidic pH.

23. The method of claim 22 wherein said wash solution has a pH of less than about 4.5.

24. The method of claim 22 wherein said oil based component is said ink composition.

25. The method of claim 22 wherein said receiving medium is an offset blanket cylinder.

26. The method of claim 25 including washing said blanket cylinder with said aqueous wash solution.

27. A method of recovering an ink component residue comprised of an oil based or water insoluble component residue from apparatus used in a printing process wherein said ink component is water insoluble at an alkaline pH and water washable at an acidic pH having sufficient acid strength to convert said water reducible resin to a water washable form, said method comprising the steps of:
removing said ink component residue front a portion of said apparatus using an aqueous wash solution having a pH corresponding to said acidic pH whereby a mixture of residue and wash solution is formed;
changing the pH of said mixture to a pH corresponding to said alkaline pH and
removing said ink component residue front said mixture.

28. The method of claim 27 wherein said ink component is a lithographic ink composition.

29. The method of claim 28 wherein said wash solution has a pH of less than 4.5.

30. The method of claim 27 including removing said ink residue using towels dipped in said aqueous wash solutions and cleaning said towels by changing the pH of said mixture to a pH corresponding to said alkaline pH and removing said ink residue.

31. The method of claim 27 including adjusting the pH of the solution following removal of said ink residue to an acidic pH and reusing as a wash solution.

32. An amine functional water reducible resin which is substantially water insoluble at alkaline conditions and water soluble or washable at acidic conditions, said resin having the general formula $$R-\overset{\overset{O}{\|}}{C}-NH-Z$$

where R=alkyd, polyester, polyolefin or epoxy ester backbone of a water reducible resin
Z=mono or greater amine.

33. The resin of claim 32 wherein Z is a triamine or a tetramine.

34. The resin of claim 32 wherein Z is diethylene triamine or triethylene tetramine.

35. A method of making an amine functional water reducible resin including the step of reacting an amine with an acid functional water reducible resin containing one or more free carboxyl groups.

36. The method of claim 35 wherein said reacting step is carried out at a temperature and for a time period sufficient to convert a desired amount of said carboxyl groups to amine functional groups by forming amide linkages through said carboxyl groups.

* * * * *

UNITED STATES PATENT AND TRADEMARK OFFICE
CERTIFICATE OF CORRECTION

PATENT NO. : 5,354,366
DATED : October 11, 1994
INVENTOR(S) : Thomas J. Pennaz et al.

It is certified that error appears in the above-indentified patent and that said Letters Patent is hereby corrected as shown below:

In column 4, line 32, delete "front" and insert --from--.

In column 6, line 25, delete "o".

In column 12, line 30, delete "tile" and insert --the--.

In column 12, line 39, delete "tile" and insert --the--.

In column 15, line 53, delete "m" and insert --in--.

In column 21, line 22, delete "resin".

Signed and Sealed this

Third Day of October, 1995

Attest:

BRUCE LEHMAN

*Attesting Officer*　　　　*Commissioner of Patents and Trademarks*